United States Patent [19]

Charvat

[11] 3,864,101
[45] Feb. 4, 1975

[54] PROCESS FOR PREPARING A RESIN-BONDED GRINDING ARTICLE CONTAINING STRESS-ABSORBING PARTICULATE MATERIAL

[75] Inventor: Vernon K. Charvat, Bay Village, Ohio

[73] Assignee: The Sherwin-Williams Company, Cleveland, Ohio

[22] Filed: Apr. 19, 1972

[21] Appl. No.: 244,965

[52] U.S. Cl.......................... 51/298, 51/293, 51/295
[51] Int. Cl...................... C08g 51/12, C08g 51/14
[58] Field of Search ............. 51/295, 298, 297, 296, 51/293

[56] References Cited
UNITED STATES PATENTS

| | | | |
|---|---|---|---|
| 2,943,926 | 7/1960 | Goepfert | 51/298 |
| 3,226,214 | 12/1965 | Daniels | 51/298 |
| 3,252,775 | 5/1966 | Guilbert | 51/296 |
| 3,406,020 | 10/1968 | D'Alessandro | 51/298 |
| 3,518,068 | 6/1970 | Gillis | 51/295 |
| 3,592,618 | 7/1971 | Alden | 51/298 |
| 3,632,320 | 1/1972 | Henmi et al. | 51/298 |
| 3,645,706 | 2/1972 | Bovenkerk | 51/309 |
| 3,661,544 | 5/1972 | Whitaker | 51/298 |
| 3,664,819 | 5/1972 | Sioui et al. | 51/295 |
| 3,684,466 | 8/1972 | Petrone | 51/298 |
| 3,718,447 | 2/1973 | Hibbs | 51/298 |

*Primary Examiner*—Donald J. Arnold
*Attorney, Agent, or Firm*—Donnelly, Maky, Renner & Otto

[57] ABSTRACT

A process is described for manufacturing resin bonded grinding articles such as grinding wheels and segments. The process comprises preparing a mixture of abrasive grain particles, particulate spacer material and a curable liquid resin, filling a mold with the mixture and curing the mixture to a solid article in the absence of external pressure. Grinding articles prepared in this manner and containing high concentrations of abrasive grain particles exhibit superior grinding wheel performance in rate of stock removal with no metallurgical damage to the steel being worked upon while maintaining precision of cut.

15 Claims, No Drawings

PROCESS FOR PREPARING A RESIN-BONDED GRINDING ARTICLE CONTAINING STRESS-ABSORBING PARTICULATE MATERIAL

BACKGROUND OF THE INVENTION

This invention relates to a method of manufacturing grinding articles such as grinding wheels, segments and the like. More particularly, this invention relates to a method of preparing resin bonded, grinding articles which are rigid but not brittle, and effective for high speed and high rate of metal removal grinding operations.

A grinding wheel, in contrast to a polishing or finishing wheel, is capable of making a cut of a substantial depth in a work-piece which may be of cast iron or steel. The characteristics of grinding wheels are well known and described in, for example, "The Grinding Wheel" by Kenneth B. Lewis, published 1959, by the Grinding Wheel Institute, Cleveland, Ohio. Generally, such grinding wheels have comprised a mass of densely compacted abrasive grains bonded together by a molded or fired ceramic material or a resin bonding agent. The procedures for preparing such wheels have involved some difficulty with regard to the placement of the granular abrasive in the mold and usually require extended baking or curing periods.

One method known in the prior art for obtaining the desired high concentration of abrasive grains in the grinding articles involves mixing the grains and the binder and forming the article under extremely high pressure. This method, though permitting the formation of articles containing a high concentration of grain, does not provide any control of the grain arrangement. In another prior art method, mixtures of grain and resin are centrifuged to concentrate the grain at the periphery of the mold with only a minimal amount of resin in this area for bonding. The grain in such prepared wheels are in intimate contact with one another and the wheels have not performed as well as anticipated. This is probably due to the presence of the touching grains which result in a buildup of stress concentration and heat on grinding which, as mentioned above, weakens the wheel and causes metallurgical damage.

Many of the known grinding wheels are quite fragile or brittle. In operation, they require frequent dressing to insure maintenance of the desired tool face contour to obtain a cut of the required profile. Those wheels which have been hard enough to be capable of a fast or deep cutting action such as is needed for abrasive machining, requiring imposition of high unit pressures have not been capable of simultaneously producing a finished surface of the quality desired. Usually, metallurgical damage to the work results from the use of such wheels at high unit pressures. High unit pressures applied in spite of the foregoing disadvantages increases wheel wear so as to give a grinding ratio (stock removed vs. wheel volume loss) which is completely uneconomical. These problems are thought to be due to improper grain concentration and to non-uniform arrangement of the abrasive grains or could be due to the presence of a large number of clusters wherein the grains are in intimate contact with one another. On grinding, heat and stress build up in these cluster areas which act as stress raisers and heat sinks weakening the grinding tool and also causing damage to the surface being treated. Consequently, it is common practice to have a preliminary rough grinding step followed by a finishing operation.

Polishing tools, ordinarily a flexible wheel of leather or fabric coated with abrasive, have also been known in which polishing materials have been incorporated in a body of yielding elastomeric material such as natural and artificial rubber and various synthetic resins. While suitable for use in cleaning or conventional polishing operations, such articles lack the dimensional stability and rigidity necessary for grinding wheels which must remove stock accurately and swiftly in significant amounts.

In contrast to the tools generally described above, U.S. Pat. No. 3,377,411 describes the process for producing an improved abrasive tool, and particularly a grinding wheel wherein the granular abrasive material is disposed within the binder matrix or body in such a manner as to achieve a dynamically stronger tool which is essentially rigid considered as a whole as needed for commercial grinding work. However the individual abrasive grains exposed at the working surface of the tool are slightly spaced apart and capable of individual micro-movement or adjustment relative to each other without being dislodged from their sockets in the binder. The binder or bond is capable of a limited amount of local elastic deformation when exceptionally high pressures are imposed on the individual exposed grains. Thus, a grinding tool prepared in accordance with the procedure of U.S. Pat. No. 3,377,411 may be fed rapidly into the work to produce a relatively deep cut without producing either thermal damage of the work surface or prematurely dislodging excessively protruding grains in the tool face which would result in rapid breakdown of the tool profile. Any such excessively protruding grains are forced inwardly of the tool face under the operating pressure until substantially all of the grains exposed at the surface of the tool bear against and act upon the work. This action is achieved, however, without measurable distortion of the tool considered as a whole so that with an advance of the wheel in an amount of even 0.001 inch the work piece will be reduced a corresponding amount and accordingly a dimensionally true cut is produced as is expected for all true grinding wheels.

The wheel described in U.S. Pat. No. 3,377,411 is prepared by a method which comprises mixing the abrasive particles in a foamable binder medium, centrifuging the resultant mixture in a rotatable mold to concentrate said particles in a radially outer local region of said mold, foaming said centrifuged mixture to separate the concentrated abrasive particles only slightly uniformly apart, and thereafter setting the binder.

SUMMARY OF THE DISCLOSURE

The invention of this application provides a method of preparing articles of the type described in U.S. Pat. No. 3,377,411 which are rigid but not brittle and wherein the granular abrasive is present in an amount per unit volume of from about 75 to 100 percent of the bulk density of said abrasive. Centrifuging is not utilized in the process. The abrasive is concentrated but slightly spaced apart. The interstices between the abrasive particles contain a particulate spacer material. The spacer material may be organic resin powders or inorganic particulate materials such as mica. The mass is held together by a cured resin binder.

The wheels described above are prepared by the method of the invention which comprises preparing a mixture of the abrasive particles, the particulate spacer, and a quantity of a curable liquid resin, filling a mold with the abrasive mixture and curing the mixture to a solid article in the absence of the usual external pressure.

DESCRIPTION OF THE PREFERRED EMBODIMENTS

The abrasive mixture utilized in the process of this invention comprises the abrasive particles, the spacer material, and the curable liquid resin. The type, grit size and amount of abrasive material may be varied to produce a wide variety of useful products. Any of the commonly available abrasive grains may be employed in the articles and manufacturing methods of this invention.

Examples of abrasives which may be used in the process of the invention include fused alumina, sintered alumina, silicon carbide, emery, garnet, talc, and pumice depending upon the abrading action and the resultant surface finish desired. While grit sizes of from about 600 to 10 mesh may be utilized, the ordinary range will be from about 320 to about 24 mesh and most frequently from about 60 to 36 mesh.

The resin-bonded rigid grinding articles of this invention are characterized as containing a high concentration e.g. from about 70 to 80 percent by weight of the mixture of abrasive grains which are nevertheless slightly spaced apart. This combination of requirements means that while a large amount of abrasive is used, the actual volume put in is slightly less than would fill the mold if such an amount was simply poured into it. The new technique involves arranging and uniformly spacing this slightly smaller volume of abrasive so it entirely fills the mold exactly. Such an exact volume of abrasive affords a large number of cutting points, as is needed to do efficient grinding work, while yet providing the space and the capacity for the individual abrasive grains exposed at the working face to micro compress from their normal position to absorb impact energy. This minimal micro adjustment or yielding action occurs on an individual grain basis and does not effect the essentially rigid character of the article. The amount of abrasive grains required in the articles of this invention in order to obtain the desired properties should be above about 75 percent by weight and preferably from about 30 to 50 percent by volume of the article.

The precise theoretical amount of abrasive grain to be utilized in the method of this invention in any particular instance will depend upon the desired wheel characteristics which are derived in part from the selection of abrasive to be used. After this the nature and prior history of the abrasive grain such as specific gravity, bulk density, size, shape, and purity must be known or established. These abrasive grain physicals are then utilized to obtain the formulation which will produce the critical balance of dense concentration of abrasive grains which are slightly spaced apart.

The exact weight of a particular abrasive grain to be employed preferably is calculated from a consideration of the bulk density (grams/unit volume obtained by free fall or equivalent procedure). The term "bulk" or "pack" density of abrasive grains is well known and understood in the art. The bulk density of various grains is available from the producers thereof as an average or it can be determined easily for any specific batch by experimentation. The term is defined by The Grinding Institute as the weight in air of a given volume of the permeable material (including both permeable and impermeable voids normal to the material) expressed in grams per cubic centimeter.

In order to obtain the desired grinding articles of this invention, it is preferred that an amount of abrasive equal to from about 75 to about 100 percent of the bulk or pack density of the particular abrasive be employed in the article. The amount of abrasive material to be utilized for preparing particular grinding articles is determined from a consideration of the end use of the wheel. For example, high speed, high-metal removing grinding articles will generally contain greater amounts of abrasive material. For such uses, abrasive contents equal to from about 85 to 100 percent of the bulk density are common.

The wetting ability and purity of the abrasive grain may be improved by removing acidic or basic impurities from the surface of the abrasive. The abrasive grains must have friability, shape, and hardness properties which are compatible with the spacer material and the liquid binder in which it is embedded.

In addition to the abrasive particles, the abrasive mixtures utilized in the preparation of the grinding articles of this invention contain a stress-absorbing particulate spacer material of dual function. First it must serve to maintain the abrasive grains slightly spaced apart during the formation of the grinding article and second to act as part of the stress absorbing bond material during wheel operation. The particulate spacer material can be either an organic resinous powder or an inorganic particulate material. Examples of organic resinous powders which can be utilized include polyurethane, polyethylene, polystyrene, epoxy, phenolic and silicone resins.

The third material required is the liquid phase bond plastic, preferably an epoxy. Ordinarily this is the primary bond substance since it not only fixes the abrasive mass to cake the structure as placed in the mold so that complete curing can take place without change in volume but it may be the major or only bond material present. Additionally the liquid phase plastic is capable of being used in varying amounts to permit total bond volume content to be adjusted to suit the work of grinding to be done. Hard strong wheels may require a total bond content of say 45 percent whereas soft acting wheels need an amount in the range of 35 percent.

The polyurethanes are well known compositions and are formed by the reaction of a diisocyanate with an active hydrogen-containing composition such as the polyesters and polyethers. It is preferred that to use a polyester containing three hydroxyl groups which can subsequently be cross-linked with the diisocyanate to form the finished rigid polyurethane. Similarly, cross-linkable polyethers of triols which provide suitable sites for cross-linking reactions may be utilized. The diisocyanates with which the active hydrogen-containing composition is reacted are generally aromatic or aliphatic. Examples of aromatic diisocyanates include 2,4-toluene diisocyanate, 2,6-toluene diisocyanate, 4,4'-diphenylmethane diisocyanate, 1,5-naphthalene diisocyanate, 5-nitro-1,3-phenylene diisocyanate, and xylylene-1,4-diisocyanate. Alkylene diisocyanates such as tetramethylene diisocyanate, hexamethylene diisocyanate and mixtures thereof also are useful. Polyurethanes obtained in this manner can be reduced to a powder form for utilization in the method of this invention.

Epoxy resin powders are also effective in the method of this invention as spacer materials particularly when the liquid curable resin binder component is an epoxy resin. The epoxy resins are well known, and of all the thermosetting resins, they are probably more widely used in structural application areas than other plastic materials.

The epoxy resins utilized in the invention may be any one of a number of well known resins characterized by the presense therein of an epoxide group, i.e.

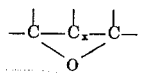

wherein $x$ is 0 or a small whole number. Such resins have either a mixed aliphatic aromatic or an exclusively non-benzenoid (i.e., aliphatic or cyclo-aliphatic) molecular structure. The mixed aliphatic-aromatic epoxy resins generally are prepared by the well-known reaction of a bis-(hydroxyaromatic) alkane or a tetrakis-(hydroxyaromatic) alkane with a halogen-substituted aliphatic epoxide in the presence of a base such as, for example, sodium hydroxide or potassium hydroxide. Examples of the halogen-substituted aliphatic epoxides include epichlorohydrin, 4-chloro-1,2-epoxy butane, 5-bromo-1,2-epoxy pentane, 6-chloro-1,3-epoxy hexane and the like. In general it is preferred to use a chlorine substituted terminal alkylene oxide (terminal denoting that the epoxide group is on the end of the alkyl chain).

Examples of the bis-(hydroxyphenyl)-propane; 2,2-bis-(1-hydroxy-4-naphthyl)-propane; 2,2-bis-(o-hydroxyphenyl) propane; and 2,2-bis-(p-hydroxyphenyl) propane. The latter compound is commonly referred to in the trade as "Bisphenol A."

Epoxy resins of the type described above are available from a wide variety of commercial sources. One group is known by the general trade designation "Epon" resins, and are available from Shell Chemical Co. For example, "Epon 820" is an epoxy resin having an average molecular weight of about 380 and is prepared from 2,2-bis-(p-hydroxyphenyl) propane and epichlorohydrin. Similarly, "Epon 1031" is an epoxy resin having an average molecular weight of about 616 and is prepared from epichlorohydrin and symmetrical tetrakis-(p-hydroxyphenyl) ethane. "Epon 828" has a molecular weight of 350–400 and an epoxide equivalent of about 175–210.

Another group of commercially available epoxy resins are identified under the general trade designation EPI-REZ (Celanese Resins, a Division of Celanese Coatings Company). For example, EPI-REZ 510 and EPI-REZ 509 are commercial grades of the diglycidyl ether of Bisphenol A differing slightly in viscosity and epoxide equivalent.

Another group of epoxy resins are available from Furane Plastics Inc., Los Angeles, Calif. under the general trade designations EPIBOND and EPOCAST. For example, EPIBOND 100A is a one component epoxy resin powder available from Furane which is curable to a hard resin in the absence of any hardener.

Phenolic resin powders also may be useful as spacers in the invention. These resins generally are prepared by reacting phenol with an aldehyde such as formaldehyde in the presence of an alkaline or acid catalyst. There are two types of phenolic resins available and these are generally designated as single-state (resol) and two-stage (novolac) condensation products. A higher mole ratio of formaldehyde to phenol is used to form a resin which is ultimately thermosetting. That is, under continuous application of heat, the condensation process continues and forms an insoluble, infusible material. No additional aldehyde or cross-linking agent is required. The one-stage type of resin formed by this and similar procedures shows a fast cure rate and good chemical resistance.

The two-stage or novolac resins are commonly reaction products of phenol and a reduced mole ratio of formaldehyde under acidic conditions, and require the addition of a hardener or cross-linking agent such as hexamethylenetetramine. Specific examples of commercially available phenolic resins include those liquid phenolic resins available from the Union Carbide Plastics Company under the trade designations BRLA 2761 and BRLA 2760.

Other spacer materials contemplated as useful in this invention include polyethylene powders and beads, polystyrene powders and beads, glass beads, mica, graphite powder, iron pyrites, etc.

Any of the above described resin or inorganic powders can be utilized as spacer material in this invention. Such spacer material should be so finely ground that it may be uniformly dispersed throughout the grinding article even when present in small amount. The particle size of the spacer material will also influence the arrangement and concentration of the abrasive grains and should be taken into consideration when preparing the abrasive mixture. Generally, the spacer material utilized is rather fine particulate material such as 325 mesh mica or a similar size resinous powder.

The amount of spacer material included in the abrasive mixture will vary and may depend on the grain concentration desired in the final article. For example, if it is desired to have an abrasive content in the abrasive article equal to 100 percent of the packed density of the particular abrasive employed, then the particulate spacer material should be incorporated in amounts which would be consistant with this level of abrasive content since any excess will cause a decrease in the packed density by forcing the abrasive grains apart and thereby reducing the concentration of abrasive grains. On the other hand, where it is desired to prepare abrasive articles having an abrasive content equal to less than 100 percent of the packed density, then it is required that sufficient particulate spacer material and/or curable liquid binder resin be incorporated into the mixture to reduce the concentration of the abrasive grain to the level desired.

The spacer material, in addition to affecting and maintaining the abrasive arrangement in the grinding articles, aids in removing some of the heat generated on grinding by absorbing such heat. The spacer material aids in reducing stresses within the grinding articles which might otherwise lead to cracking and bursting of the article, and provides the grain particles an opportunity of individual micro-movement when subjected to the severe impact stresses as the wheel is forced into the workpiece. Any of the above mentioned resins which are available also in liquid form may be utilized as the liquid binding resin. In general, when the particulate spacer material is an organic resin powder, it is preferred that the resin powder and the curable liquid binding resin be compatible in terms of the wheel structure.

The liquid binding resin is preferably one that will bond readily to the abrasive particles and the stress-absorbing particulate spacer material when it is hardened. Therefore, the liquid resin generally is the uncured phase of a thermosetting resin. The abrasive particles, the spacer material and the liquid resin are mixed and then molded or otherwise formed under the conditions required to cure (harden) the liquid resin thereby providing a monolithic mass of resin binder holding in place the abrasive grains and the spacer material.

In those instances where the particulate material is a resin powder, and in particular, a curable resin powder, the mixture of liquid resin, resin powder and abrasive grain is molded or formed into a shape and heated. In a preferred embodiment, a curable liquid binding resin is selected which begins to cure and harden at a lower temperature than the curing temperature of the resin powder. In this manner, the liquid resin begins to cure and harden as the temperature is raised and thus provides a mechanism for holding the abrasive mixture intact while maintaining the abrasive grains in their original positions. As the temperature continues to rise, both the liquid binding resin and the resin powder is cured to its hardened and form stable condition. In the absence of any significant external pressure, the shape and volume assumed is that of the mold, and the arrangement of the abrasive grains and spacer material within the shape is undisturbed. No shrinking of the resin or overall reduction in volume is observed.

It is desirable that the grinding articles of this invention have an abrasive content equal to from about 75 to about 100 percent of the bulk or pack density of the particular abrasive grain employed. Thus, the amount of abrasive grain on a weight basis to be utilized in the preparation of a particular article is calculated by multiplying the volume of the article times the bulk density of the grain which should be determined for each particular type of grain times the percentage of bulk density to be used as needed for the grinding work to be done. For example, the average true density for a pure white ground aluminum oxide type 60 grit is about 3.95 g/cm$^3$ but the tap bulk density is 1.98 g/cm$^3$. Therefore, if the grinding article to be prepared is a wheel having a volume of 315 cm$^3$, an abrasive content equal to 100 percent of the tap density would be 315 cm$^3$ × 1.98 g/cm$^3$ × 1 or 624 g. An abrasive content equal to 90 percent of the tapped bulk density would be 315 cm$^3$ × 1.98g/cm$^3$ × 0.9 or 561 g.

One of the characteristics of the grinding articles prepared by the process of the invention is the presence of voids or small open spaces which because they are present in a closely controlled amount, appear to contribute to the desirable properties of the articles. The amount of voids present can vary from a very small amount such as around 0.5 to 1 percent by volume to larger amounts such as 20 to 25 percent by volume. Control of the amount of void space is obtained by proper selection of the amounts of ingredients added to the mold. A consideration of the proposed end use of the article determines the amounts of voids to be included. Generally, the "freedom" of cutting action of the article increases with increasing amounts of voids.

In general, the weight of spacer material to be added to a batch of abrasive to be utilized in accordance with this invention will range from about 5 to 30 percent by weight of the abrasive content. The weight amount of liquid resin binder to be incorporated into the abrasive mixture is ordinarily in the range of 10 to 35 percent of the weight of the abrasive. The most important consideration is that in the embodiment of the invention wherein the spacer material is a resinous powder, the total amount of resin powder and liquid binding resin in the grinding article will comprise about 35 to 50 percent by volume of the article.

While the tool form in which the present invention will probably find its greatest utility is that of a grinding wheel, it will be appreciated that other tool forms utilizing the improvements of the present invention may also be employed. For example, the resin may be extruded or molded in the form of an abrasive containing cylindrical member or stick. The tool may comprise a metal cup provided with a co-axial stem adapted to be chucked in a drill press or the like. A cylindrical abrading element of the general character of such stick may be secured within the cup, or alternatively a cylindrical abrading element having a conical tip portion may be similarly mounted. Other tool forms such as blocks, belts, toothed or slotted wheels, may also employ the features of the improvements of the present invention.

Abrasive discs may likewise be produced in accordance with this invention comprising the usual circular base plate to which the disc is adhered by a suitable adhesive in well-known manner. Such disc may be in the form of a truncated cone formed of the resin containing granular abrasive therewithin. A coaxial stud or stem is provided on the plate for chucking in an appropriate rotary power tool.

It will be obvious that by employing a mold of different contour and varying dimensional relationships of parts, not only may such improvements of the present invention be employed for making grinding wheels, but abrasive tools of any of the several types currently employed. For example, wheels having special curved faces may be employed for various applications. Also, a cup, cylinder or cone may be employed either by centrifuging the components in a mold of corresponding shape or by cutting sections from a portion of a wheel-like article made as hereinbefore described.

The following examples illustrate the detailed procedures for preparing grinding wheels in accordance with the procedures of this invention whereby the volume amounts of the various ingredients are controlled and predetermined. Unless otherwise indicated, all parts and percentages are by weight.

EXAMPLE 1

Step 1. Compute the wheel volume for a wheel having a 7 inches outer diameter and a ½ inch face (neglecting the small arbor hole)

$$V = 3.14 \times 3.5^2 \times \frac{1}{2} = 19.24 \text{in}^3 \times 16.3872 = 315 \text{ cm}^3$$

Step 2. Select the abrasive grain to be utilized and determine its bulk or pack density. For pure aluminum oxide, 60 grit size, the bulk or tap density is 1.98 g./cm$^3$ Step 3. Decide on the abrasive grain density desired in the wheel to suit the work to be accomplished, the work piece geometry, and operating conditions. In this example, a 95 percent tap density will be assumed. Therefore, the amount of abrasive on a weight basis will be 315 cm³ × 1/98 g/cm³ × 0.95 = 593 g. abrasive Step 4. The amount of particulate spacer material required to be mixed with 593 grams of abrasive to obtain a volume of 315 cm³ is determined by slowly adding and mixing the spacer material to the abrasive grain until the desired volume is reached. In this example it is found that approximately 41.5 grams of powdered EPIBOND 100A is required to produce the desired volume. This represents approximately 7 percent by weight epoxy powder.

Step 5. The amount of liquid epoxy utilized in this example is 10 percent by weight based on the weight of the abrasive. Thus, 59.3 grams of liquid epoxy resin are required. This amount is, in fact, a mixture of resin and hardener which are utilized in the recommended proportions of 100 parts of resin to 27 parts of hardener which is equal to 46.7 grams of the liquid Maraset and 12.6 grams of the hardener. The liquid resin is "Maraset Resin 622C" and the hardener is identified as "Hardener No. 75" both available from the Marblette Corporation, Long Island City, N.Y.

Step 6. A mixture of 593 grams of the abrasive grains, 59.3 grams of the epoxy liquid mixture and 41.5 grams of the epoxy powder is prepared and placed in a mold constructed to provide the wheel having a 7 inches outer diameter, a ½ inch thickness and a 1 ¼ inch arbor hole. After placing the mixture in the mold, the mixture is leveled without packing and the mold is closed without asserting any significant pressure against the mixture concept that required to obtain a flat surface. The filled mold is baked at a low temperature (200°F) for 2 hours and at a higher temperature (380°F) for 3 hours. The initial heating period cures the liquid epoxy whereas the elevated temperature completes the cure of the liquid epoxy and effects curing of the powder epoxy in the mixture.

The wheel prepared in accordance with the above procedure may be characterized as follows.
Abrasive volume = 150.2cm³
Epoxy liquid volume = 49.4cm³
Epoxy powder volume = 34.6cm³
Total solids volume = 234.2cm³
Void volume = 315cm³ − 234.2cm³ = 80.8cm³
Volume percent abrasive = 150.2/315 × 100 = 47.7%
Volume percent epoxy liquid = 49.3/315 × 100 = 15.7%
Volume percent epoxy powder = 34.6/315 × 100 = 11.0%
Volume percent voids = 80.8/315 × 100 = 25.6%

EXAMPLE 2

The procedure of Example 1 is repeated except that the wheel is prepared having an abrasive concentration equal to 80 percent of the bulk or tap density of the aluminum oxide grit. Thus, only 498 grams of abrasive grain is utilized which represents a volume percent of abrasive equal to 40.2 percent.

The wheel of this example is prepared containing a total resin bond concentration of 40 percent by volume. Since the specific gravity of the epoxy resin is 1.2, and the wheel volume is 315cm³, 151 grams of resin bond is needed which in this example is a mixture of epoxy powder and liquid epoxy resin. The amount of epoxy powder needed as determined experimentally for Example 1 is 37.5cm³, and an additional amount to compensate for the reduced amount of abrasive in this example if the total volume is to be kept constant. Since this example utilizes 126 grams of abrasive less than Example 1, and the specific gravity is 3.95, this represents a loss in volume of 31.9cm³. Therefore, the amount of epoxy powder utilized in this example should be 31.9cm³ more than utilized in Example 1, or a total of 69.4cm³ which is equivalent to 73.2 grams of the epoxy powder.

If the total epoxy content is to be 151 grams (40 percent by volume), then the epoxy liquid content is 67.8 grams. Utilizing a resin to catalyst ratio of 100 parts of resin to 27 parts of catalyst, the epoxy liquid content will comprise 53.4 grams of the resin and 14.3 grams of the hardener.

A mixture prepared in accordance with the above calculations comprising 498 grams of pure aluminum oxide abrasive grains (60 grit) 83.2 grams of EPIBOND 100A (powder), 53.4 grams of "Maraset Resin 622C" and 14.3 grams of the hardener described in Example 1. This mixture is placed in a mold having a 7 inches ID × ½ inch face and an arbor hole of 1.25 inches. The mixture is leveled without packing and the mold is closed. The baking procedure described in Example 1 is repeated. After cooling, the wheel is removed from the mold.

The abrasive grinding wheel prepared in this example has 40 percent by volume of abrasive, 40 percent by volume of epoxy resin, and 20 percent of void space.

EXAMPLE 3

In this example, a wheel of the same dimensions described in Example 1 is prepared utilizing a different formulation. The amount of 60 grit aluminum oxide is reduced to 70 percent of its bulk density, and 4 volume percent of a 325 mesh white water ground mica is included in the formulation. By following the calculations described previously, it is determined that the formulation should contain 436.5 grams of abrasive, 35.8 grams of mica, 102 grams of the epoxy powder, 38.7 grams of the liquid epoxy and 10.5 grams of the hardener.

The wheel prepared in accordance with this example contains 35 percent by volume of abrasive, 4 percent by volume of mica, 40 percent by volume of epoxy resin and 21 percent of void space.

EXAMPLE 4

An abrasive mixture is prepared containing 3,630 parts of aluminum oxide abrasive grains (60 grit), 260 parts of an epoxy resin powder commercially available under the trade designation EPIBOND 100A (from Furane Plastics Inc., Los Angeles, Calif.) and 210 parts of the liquid epoxy resin:hardener combination described in Example 1 and comprising a mixture of resin and hardener in the ratio of 100:27 parts. A portion of this abrasive mixture (3,700 parts) is placed into a wheel mold preheated to 350°F to form a wheel twelve inches in diameter and one inch thick with a center arbor hole 3 inches in diameter. The mold is capped with the application of sufficient pressure to obtain a smooth flat surface. The mold is placed in an oven and heated at 200°F for 2 hours and at 350°F for 3 hours whereupon the mold is removed from the oven. After cooling, the wheel is removed from the mold. A wheel obtained in this manner is capable of removing metal in a grinding operation without visual signs of metallurgical damage or change to the piece subjected to the grinding operation.

EXAMPLE 5

The procedure of Example 4 is followed except that the abrasive mixture contains 3,275 parts of abrasive grains, 235 parts of the epoxy powder and 379 parts of the liquid epoxy resin:hardener mixture. The wheel obtained in this manner exhibits increased hardness as compared to the wheel obtained in Example 4.

EXAMPLE 6

A wheel is prepared from an abrasive mixture containing 508 parts of abrasive (EIB), 80.1 parts of "Maraset Resin 644C," 21.9 parts of Hardener No. 75, 83.6 parts of the powdered EPIBOND 100A and 45 parts of 325 mesh white waterground mica. The procedure of Example 1 is followed.

EXAMPLE 7

A grinding wheel 7 inches in diameter, ½ inch in thickness, and having a center hole 1 ¼ inches in diameter is prepared by filling an appropriate mold with an abrasive mixture containing 572 parts of Ruby G aluminum oxide abrasive grains, 80.1 parts of "Maraset Resin 644C", 21.9 parts of Hardener No. 75, 82 parts of the powdered EPIBOND 100A and 100 parts of 325 mesh mica. This wheel prepared in accordance with the procedure of Example 1 is hard, and capable of grinding steel.

EXAMPLE 8

A grinding wheel 7 inches in diameter and 7/16 inch in thickness (volume = 276cm$^3$) is prepared by filling an appropriate mold with an abrasive mixture comprising 493 g of 60 grit size aluminum oxide, 108 g of "Maraset Resin 644C," 29 g of Hardener No. 75 and 30 g of powdered EPIBOND 100A. This wheel, prepared in accordance with the procedure described in Example 1 is hard and capable of grinding steel. The wheel contains, on a volume basis, 45.3% abrasive, 53% plastic, and 1.34% void space.

EXAMPLE 9

The procedure of Example 1 is repeated using a different formulation to incorporate 4 percent by volume of 325 mesh white water ground mica. The amount of aluminum oxide grain is maintained at 95 percent of its tap density.

A mixture is prepared comprising 592 grams of aluminum oxide grain, 54.7 grams of the powdered epoxy resin, 90.7 grams of the "Maraset Resin", 24.5 g of Hardener Z and 35.8 grams of mica. The mixture is placed in the mold and leveled without packing. The mold is closed and the mixture in the mold is cured as described in Example 1.

The grinding wheel obtained in this manner has an abrasive volume of 47.6 percent, a mica volume of 4.0 percent, a plastic volume of 45.2 percent and 3.4 percent of void space.

What is claimed is:

1. A process for preparing a resin-bonded rigid grinding article containing above about 70 percent by weight of the article of abrasive particles wherein said particles are spaced apart in the article by solid-spacer material which comprises
   a. preparing an abrasive mixture consisting essentially of
      i. a sufficient amount of abrasive particles to provide an abrasive content in the mixture of from about 75 to about 100 percent of the bulk density of the abrasive; said abrasive having a particle size of from about 600 to 10 mesh,
      ii. from about 5 to 30 percent by weight of the abrasive particles of stress-absorbing particulate solid spacer material,
      iii. from about 10 to 35 percent by weight of the abrasive particles of a liquid-binding resin capable of being cured to a solid without a substantial change in volume,
   b. filling the mold with the abrasive mixture without substantially compressing said mixture, and
   c. curing the abrasive mixture in the mold in the absence of a significant amount of external pressure and change in volume to form a rigid-grinding article having the shape and volume substantially as that of the mold.

2. The process of claim 1 further characterized in that curing is effected at elevated temperatures.

3. The process of claim 1 further characterized in that the particulate solid spacer material is a curable organic resin powder.

4. The process of claim 1 further characterized in that the liquid binding resin is a liquid-epoxy resin and the particulate solid-spacer material is a curable organic resin powder.

5. The process of claim 4 further characterized in that the liquid epoxy resin cures at temperatures lower than the resin powder.

6. The process of claim 1 further characterized in that the particulate solid-spacer material is an inorganic particulate material.

7. The process of claim 1 further characterized in that the grinding article is a grinding wheel or segment thereof wherein the particulate solid-spacer material is an epoxy-resin powder and the liquid-binding resin is a curable liquid epoxy resin.

8. The process of claim 7 further characterized in that the curable liquid epoxy resin gels at temperatures below the curing temperatures of the epoxy resin powder.

9. The process of claim 7 further characterized in that the abrasive mixture is heated in the mold to temperatures sufficient to gel and initiate the cure of the liquid epoxy resin and thereafter heated at elevated temperatures to complete the cure of the epoxy resin powder.

10. The process of preparing the rigid grinding article of claim 1 further characterized in that the abrasive particles constitute from about 30 to 50 percent by volume of the grinding article.

11. The process of claim 7 further characterized in that the total amount of liquid binding resin and the solid spacer resin powder constitute from about 35 to 45 percent by volume of the grinding wheel.

12. The process of claim 6 further characterized in that the solid spacer is an inorganic particulate material selected from the class consisting of glass beads, mica, graphite powder and iron pyrite.

13. The process of claim 1 further characterized in that the particulate solid spacer material is selected from the class consisting of polyethylene powder, polystyrene powder, epoxy powders, phenolic powders, silicone resin powders, glass beads, mica, graphite powder and iron pyrite and the curable liquid-binding resin is selected from the class consisting of epoxy resins, polyethylene, polystyrene, phenolic resins and silicone resins.

14. The process of claim 13 further characterized in that the abrasive particles are selected from the class consisting of fused alumina, sintered alumina, silicone carbide, emery, garnet, talc and pumice.

15. A process for preparing a resin-bonded rigid grinding article containing above about 75 percent by weight thereof of abrasive particles wherein said particles are spaced apart in the article by solid-spacer material which comprises a. preparing an abrasive mixture consisting essentially of
  i. a sufficient amount of abrasive particles to provide an abrasive content in the mixture of from about 75 to about 100 percent of the bulk density of the abrasive; said abrasive having a particle size of from about 600 to 10 mesh,
  ii. from about 5 to 30 percent by weight of the abrasive particles of stress-absorbing particulate solid-spacer material selected from the class consisting of polyethylene powder, polystyrene powder, epoxy powders, phenolic powders, silicone resin powders, glass beads, mica, graphite powder and iron pyrite,
  iii. and from about 10 to 35 percent by weight of the abrasive particles of a liquid-binding resin capable of being cured to a solid without a substantial change in volume; said liquid-binding resin selected from the class consisting of epoxy resins, polyethylene, polystyrene, phenolic resins and silicone resins,
b. filling the mold with the abrasive mixture without substantially compressing said mixture, and
c. curing by heating the abrasive mixture in the mold in the absence of a significant amount of external pressure to form a rigid grinding article having the shape and volume substantially as that of the mold.

* * * * *